United States Patent [19]
Tanaka et al.

[11] Patent Number: 5,671,835
[45] Date of Patent: Sep. 30, 1997

[54] WET FRICTION MEMBER

[75] Inventors: Tadashi Tanaka; Yoshikazu Mizuno; Mitsuru Sugita; Katsumi Sawano; Akira Ono, all of Nagoya, Japan

[73] Assignee: Daido Metal Company Ltd., Nagoya, Japan

[21] Appl. No.: 546,558

[22] Filed: Oct. 20, 1995

[30] Foreign Application Priority Data

Nov. 7, 1994 [JP] Japan ................. 6-298930

[51] Int. Cl.$^6$ ................. F16D 13/60
[52] U.S. Cl. ................. 192/107 R; 192/113.36; 192/70.12; 188/264 D
[58] Field of Search ................. 192/107 R, 113.34, 192/113.36, 70.12; 188/264 B, 264 D

[56] References Cited

U.S. PATENT DOCUMENTS

| | | | |
|---|---|---|---|
| 2,899,845 | 8/1959 | Nogrady, Sr. | 192/113.36 |
| 3,476,228 | 11/1969 | Pritchard | 192/107 R |
| 3,972,400 | 8/1976 | Howells | 192/107 R |
| 4,986,397 | 1/1991 | Vierk | 192/113.36 |
| 4,995,500 | 2/1991 | Payvar | 192/107 R |
| 5,094,331 | 3/1992 | Fujimoto et al. | 192/113.36 |
| 5,176,236 | 1/1993 | Ghidorzi et al. | 192/107 R |
| 5,335,765 | 8/1994 | Takakura et al. | 192/113.36 |
| 5,460,255 | 10/1995 | Quigley | 192/107 R |
| 5,501,309 | 3/1996 | Walth et al. | 192/113.36 |

FOREIGN PATENT DOCUMENTS

| | | | |
|---|---|---|---|
| 1286318 | 1/1962 | France | 192/113.36 |
| 2490756 | 3/1982 | France | 192/113.36 |
| 62-126623 | 11/1987 | Japan | |

*Primary Examiner*—Andrea L. Pitts
*Attorney, Agent, or Firm*—Browdy and Neimark

[57] ABSTRACT

A wet friction member which can maintain boundary lubrication by decreasing the thickness of oil film on a friction surface even when the sliding velocity increases. In a case where the friction surface of the friction member is in pressure contact with a mated member while rotating in a state of boundary lubrications a shearing resistance owing to viscosity of cooling oil is circumferentially applied to cooling oil in outer grooves in the friction surface. Since outer grooves extend from starting position of intermediate portions of the friction surface and terminate at the outer peripheral edge in a volute shape toward the direction of rotation, cooling oil in the outer grooves flows along the groove walls and is quickly discharged from opening portions at the outer peripheral edge.

18 Claims, 6 Drawing Sheets

WET FRICTION MEMBER

BACKGROUND OF THE INVENTION

The present invention relates to a wet friction member for use in a transmission apparatus for transmitting a driving force of a shaft of the driving side to a shaft of the driven side, and a brake apparatus or the like.

Generally, a friction clutch of an automatic transmission apparatus for a vehicle includes a plurality of plate-like friction members in cooling oil which members are interposed between a driving shaft on the engine side and a driven shaft on the wheel side. The friction clutch transmits a driving force to the driven shaft by the pressing forces of the friction members.

In such a wet friction member, the friction surface has an annular shape such as a flat disk or a conical shape, and a plurality of grooves are formed in the friction surface. Regarding the grooves in the friction surface, grooves in parallel to one another, grooves extending radially from the center, grooves in a lattice form, and the like have been conventionally known. Further, JP-U-62-126623 discloses a friction plate for a clutch, as shown in FIG. 12, in which circular grooves 92 are concentrically formed in a friction surface 2, and grooves 90 are formed in the friction surface 2 so as to extend from the middle of the plate to the outer side thereof, the grooves 90 being directed toward a direction of rotation of another mated member. Through these grooves, cooling oil is quickly removed from the friction plate at the time of clutch meeting, to thereby prevent the clutch from sliding excessively.

In the case of a wet friction member, transmission of a driving force is effected while so-called boundary lubrication occurs (small projections on a slide surface cause solid contact) between the friction surfaces of the friction member and its mated member. The friction member is rotated at a rotational velocity (a sliding velocity) slightly lower than that of the driving side while the friction surface is being slid on the mated member. In this case, as the sliding velocity increases, a friction coefficient of the friction surface decreases, which results in such a problem as the frictional member can not fully transmit the driving force.

SUMMARY OF THE INVENTION

It is an object of the present invention to obtain a wet friction member which can improve the above-described problem of the conventional wet friction member.

During the investigating of the problem of the conventional wet friction member, the inventors of the present invention have discovered that the problem is caused by the following reasons: In the case of boundary lubrication, a driving force is transmitted in a state where microscopically solid-contacted portions and separate portions simultaneously exist between a friction surface 95 of a friction member and a friction surface 96 of another mated member. However, as the sliding velocity becomes higher, the thickness of oil film between the two friction surfaces is increased so that the area of the solid-contacted portions are rapidly decreased, making it impossible to maintain the boundary lubrication. More specifically, as schematically shown in FIG. 13, owing to a difference between rotational speeds of the friction member and the mated member, cooling oil in radially extending grooves 90 flows over side walls of the grooves 90 and enters between the friction surfaces 95 and 96 due to its viscosity, thus increasing the film thickness. Therefore, it is necessary to decrease the oil film thickness by quickly discharging the cooling oil existing between the friction surfaces 95 and 96.

However, in the conventional friction plate disclosed in JP-U-62-126623 described above, the grooves 90 extend toward a direction reverse to the direction of rotation of the mated member and are opened at the inner peripheral edge 3. Consequently, cooling oil inside of the friction member flows into the grooves 90 from the openings at the inner peripheral edge 3, so that the oil film between the friction surfaces 95 and 96 can not be discharged quickly enough, and that the effect of decreasing the oil film thickness can not be fully brought about.

Therefore, the wet friction members according to the present invention have the structures in which there are provided grooves for further decreasing the thickness of oil film between the friction surfaces, thus obtaining wet friction members which can maintain boundary lubrication even when the sliding velocity increases.

Moreover, the friction surface can be provided with at least one concentrically formed circular groove, wherein it becomes possible to obtain not only the effects of the structures above but also a wet friction member of a high response quickness.

According to a first aspect of the invention, there is provided a wet friction member having a friction surface on the surface of a base thereof which member is adapted to contact with or to separate from another mated members, said friction member comprising outer grooves each of which extends from an intermediate portion of the friction surface to a terminating position of an outer peripheral edge of the friction surface so that each of the grooves is directed toward the direction of rotation of the mated member.

According to a second aspect of the invention, there is provided a wet friction member of the structure according to the first aspect, said member further including inner grooves each of which is formed in a radially inner side of the friction surface and each of which communicates with the outer grooves, the inner grooves being directed toward the direction of rotation of the mated member and opened onto an inner peripheral edge of the friction surface.

According to a third aspect of the invention, there is provided a wet friction member of the structure according to the first aspect, said member further including inner grooves each of which is formed in a radially inner side of the friction surface without communicating with the outer grooves, the inwardly extending grooves being directed toward the direction of rotation of the mated member and opened onto the inner peripheral edge of the friction surface.

According to a fourth aspect of the invention, there is provided a wet friction member according to the first aspect further including at least one circular groove which is concentrically formed in the friction surfaces.

In an operation state where the friction member is in pressure-contact with the mated member and is rotated under boundary lubrication, a centrifugal force generated by rotation is radially applied to cooling oil received in the outer grooves. Also, because of sliding rotation of the friction member, a shearing resistance owing to substantial viscosity of cooling oil in the vicinity of the friction surface of the mated member is circumferentially applied to cooling oil received in the outer grooves. The combined force of both the centrifugal force and the shearing force is applied to walls of the outer grooves. Since the outer grooves are directed toward the rotating direction of the mated member, the combined force is diagonally applied to the walls of the outer grooves. In consequence, the cooling oil in the outer grooves flows along the groove walls and is quickly discharged from the outer peripheral edge. Further, the outer grooves extend from the starting position of the intermediate portions of the friction surface and terminates onto the outer peripheral edge. Therefore, in the operation state, it does not occur that a large amount of cooling oil flows into the outer grooves to thereby increase the thickness of oil film between the friction surfaces.

According to the second aspect of the invention, the inner grooves are formed in the radially inner portion of the friction surface, and the inner grooves communicate with the outer grooves and are opened at the inner peripheral edge. Since the inner grooves are directed toward the rotating direction of the mated member, it does not occur that a large amount of cooling oil flows into the inner grooves through the openings at the inner peripheral edge. Therefore, cooling oil on the radially inner side of the friction surface flows into the inner grooves, thus preventing the oil film from increasing in thickness. Especially, in a case where inner grooves are inclined by a large degree, (that is, large inclination of the grooves with respect to the radial direction of the friction member) cooling oil in the inner grooves is discharged toward the inner peripheral edge. Thus, cooling oil is discharged in two directions, i.e., outwardly and inwardly, from the substantial widthwise middle of the annular friction surface. As the sliding velocity increases, the shearing resistance of the cooling oil increases, and the combined force of both the centrifugal force and the shearing resistance is shifted from the radial direction to the circumferential direction. Accordingly, the oil discharge along the side walls of the inner grooves toward the inner peripheral edge is further promoted.

The structure according to the third aspect of the invention is different from the structure according to the second aspect in that the inner grooves in the radially inner portion of the friction surface do not communicate with the outer grooves. Therefore, cooling oil between the two friction surfaces flows along the inner grooves and the outer grooves and is quickly discharged from the inner and outer peripheral edges, respectively.

According to the fourth aspect of the invention, when the frictional member is operated to contact with or to separate from the mated member, cooling oil between the two friction surfaces quickly flows in or is discharged out through at least one of the concentric circular grooves, thereby improving response quickness of the friction member. Since the circular groove is formed concentrically with the axis of rotation, it does not unfavorably affect the efficiency of cooling oil discharge with respect to the sliding velocity.

As has been described above, according to the first aspect of the invention, the outer grooves extend from the starting points of the intermediate portions or locations of the friction surfaces and terminate at the outer peripheral edge of the friction surface, and the outer grooves are directed toward the direction of rotation of the mated member, so that in the wet friction member it becomes possible to transmit a driving force without decreasing the friction coefficient even when the sliding velocity increases.

According to the second and third aspects of the invention, the inner grooves are formed in the radially inner side of the friction surface while directed toward the direction of rotation of the mated member and while being opened at the inner peripheral edge of the friction surface, so that the effect obtained from the structure according to the first aspect can be further enhanced.

With the structure according to the fourth aspect of the invention, the wet friction member makes it possible to bring about excellent response quickness in addition to the foregoing effects.

DESCRIPTION OF THE PREFERRED EMBODIMENTS

The preferred embodiments of the present invention applied to friction plates for clutches will be hereinafter described along with comparative examples.

Figure 1:
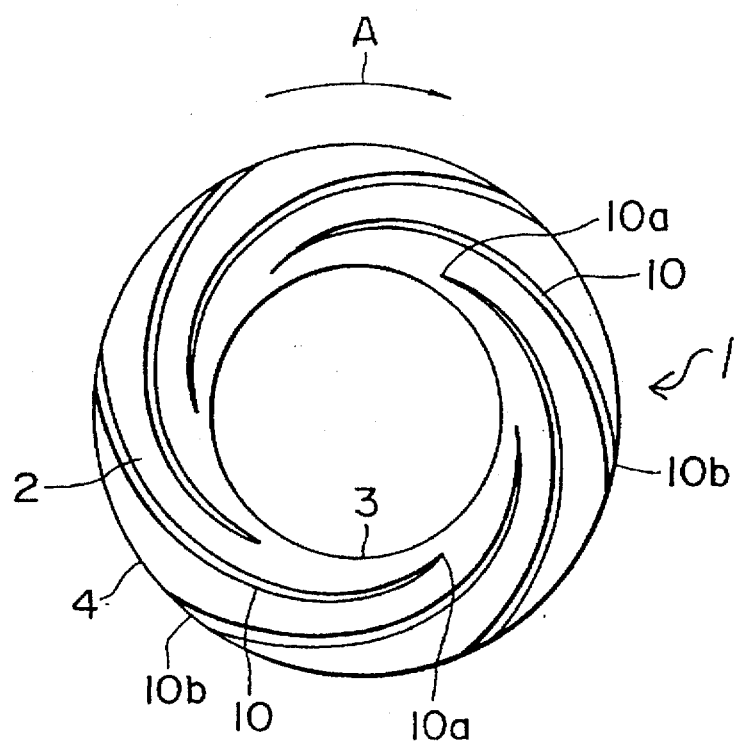
FIG. 1 is a plan view showing a friction surface of a wet friction member in an embodiment 1 embodying the invention.

Test friction plates of embodiments 1 to 4 and comparative examples 1 to 5 were manufactured. As shown in FIG. 1, for example, each test friction plate comprised a base 1 made of a copper alloy sintered metal disk of a flat annular shape having an inner diameter of 50 mm, an outer diameter of 100 mm and a disk thickness of 2.0 mm, and annular films of phenolic resin were adhered to both surfaces of the base 1. Then, various kinds of grooves were formed in the surfaces of such bases 1. Thus, a friction surface 2 having an inner peripheral edge 3 and an outer peripheral edge 4 was formed on the surface of the base 1.

FIG. 1 shows an embodiment 1 in which six outer grooves 10 are formed in a friction surface 2. The outer grooves 10 extends from the starting point of intermediate portions of the friction surface 2 in the vicinity of the inner peripheral edge and terminate onto the outer peripheral edge. A starting portion 10a of each of the outer grooves 10 has a width of 1.0 mm and a depth of 0.3 mm, and an opening end portion 10b of the outer groove 10 at the outer peripheral edge 4 has a width of 2.0 mm and a depth of 0.3 mm. Thus, the outer grooves 10 are slightly increased in width gradually toward the outer periphery so as to be increased in cross-sectional area. The outer grooves 10 extend, in a volute or spiral shape, from the starting portions 10a at an angle of about 120° toward a direction of rotation of a mated member (not shown) which direction is indicated by the arrow A. The outer grooves 10 are located symmetrically with regard to the center of the annular friction disc.

Figure 2:
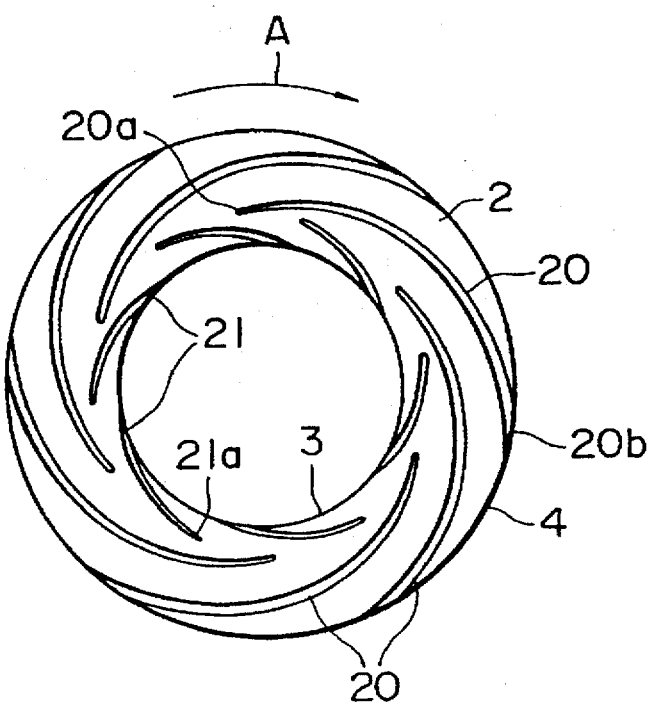
FIG. 2 is a plan view showing a friction surface of another wet friction member in an embodiment 2.

FIG. 2 shows an embodiment 2 in which six outer grooves 20 are formed in a friction surface 2. The outer grooves 20 extend from the start position of the substantial widthwise-middle or intermediate portions of the friction surface 2 and terminate onto the outer peripheral edge 4. A starting portion 20a of each of the outer grooves 20 has a width of 1.0 mm and a depth of 0.3 mm, and an opening end portion 20b of the outer groove 20 at the outer peripheral edge 4 has a width of 2.0 mm and a depth of 0.3 mm. Thus, the outer grooves 20 are slightly increased in width gradually toward the outer periphery so as to be increased in cross-sectional area. The outer grooves 20 extend, in a volute or spiral shape, from the starting portion 20a at an angle of about 120° toward the direction of rotation of a mated member (not shown) which direction is indicated by the arrow A. The outer grooves 20 are located symmetrically with regard to the center of the annular frictional disc. In addition to the outer grooves 20, six inner grooves 21 extend from the starting position of substantial widthwise-middle portions of the friction surface 2 and terminate onto the inner peripheral edge 3, thus extending toward the direction indicated by the arrow A. The inner grooves 21 are provided separately from the outer grooves 20 and do not intersect them. A starting portion 21a of each of the inner grooves 21 has a width of 1.0 mm and a depth of 0.3 mm. The inner grooves 21 are slightly increased in width gradually toward the inner periphery so as to be increased in cross-sectional area. The inner grooves 21 extend in a volute or spiral shape.

Figure 3:
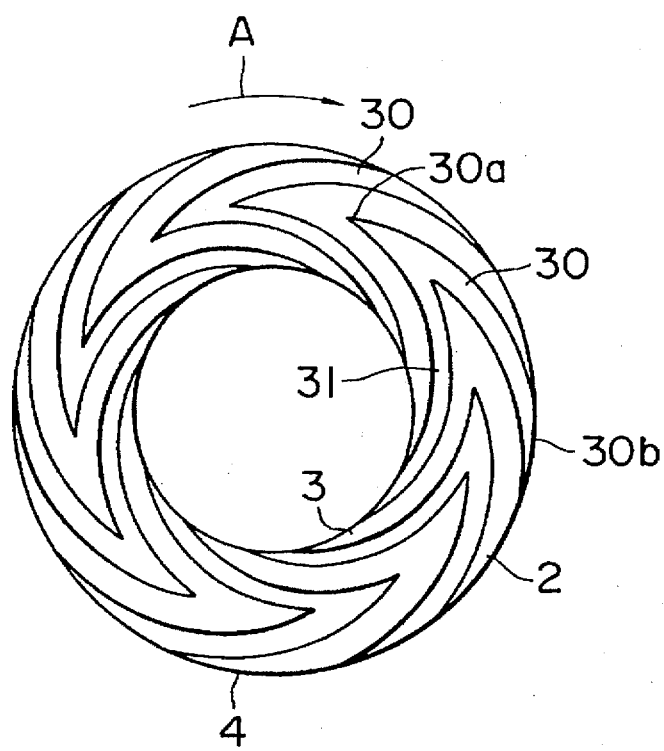
FIG. 3 is a plan view showing a friction surface of a still another wet friction member in an embodiment 3.

FIG. 3 shows an embodiment 3 in which six outer grooves 30 are formed in a friction surface 2 symmetrically with regard to the center of a annular friction disc. The outer grooves 30 extends from the starting position of the radially intermediate portions of the friction surface 2 which are somewhat closer to the inner peripheral edge, and terminate onto the outer peripheral edge. The outer grooves 30 has a uniform width of 2.0 mm and a depth of 0.3 mm. The outer grooves 30 extend, in a volute shape, from starting portions 30a at an angle of about 90° toward the direction of sliding rotation of a mated member (not shown) which direction is indicated by the arrow A. The outer grooves 30 are located symmetrically with regard to the center of the annular frictional disc. Further, other inner grooves 31 extend inwardly in a spiral shape from the same starting portions 30a as those of the outer grooves 30 and are opened at the inner peripheral edge 3. The inner grooves 31 communicate with the outer grooves at the starting portions 30a and are directed toward the rotation direction (A) of the mated member.

Figure 4:
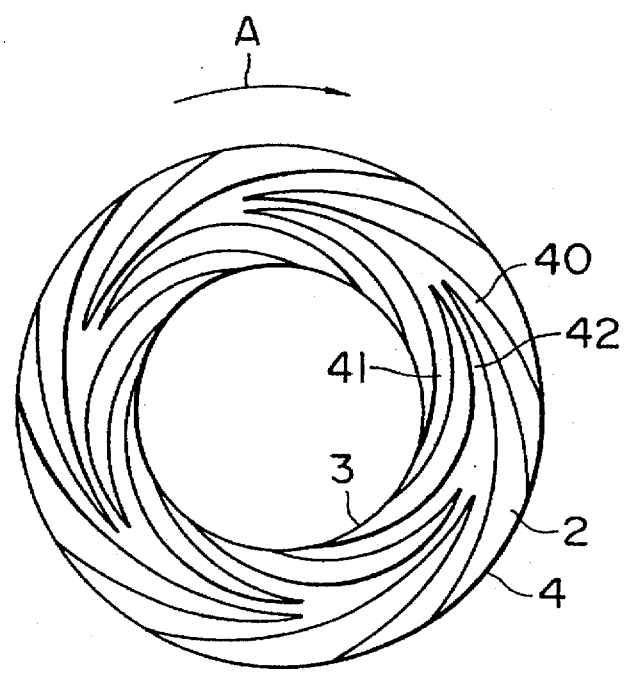
FIG. 4 is a plan view showing a friction surface of another wet friction member in an embodiment 4.

FIG. 4 shows an embodiment 4 in which outer grooves 40 and inner grooves 41 similar to the grooves of the embodiment 3 are formed in a friction surface 2, and also, a circular groove 42 having a width of 2.0 mm and a depth of 0.3 mm is concentrically formed to pass positions where the outer grooves 40 and the inner grooves 41 communicate with each other.

Figure 5:
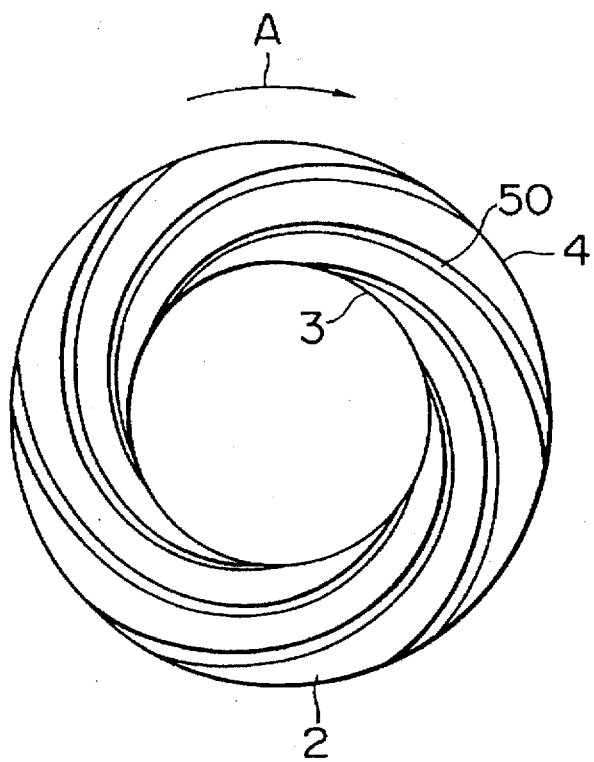
FIG. 5 is a plan view showing a friction surface of a comparative example 1.

FIG. 5 shows a comparative example 1 which has substantially the same structure as the embodiment 1 with the exception of the respect that outer grooves 50 extend between the inner and outer peripheries and are opened to the inner and outer peripheral edges.

Figure 6:
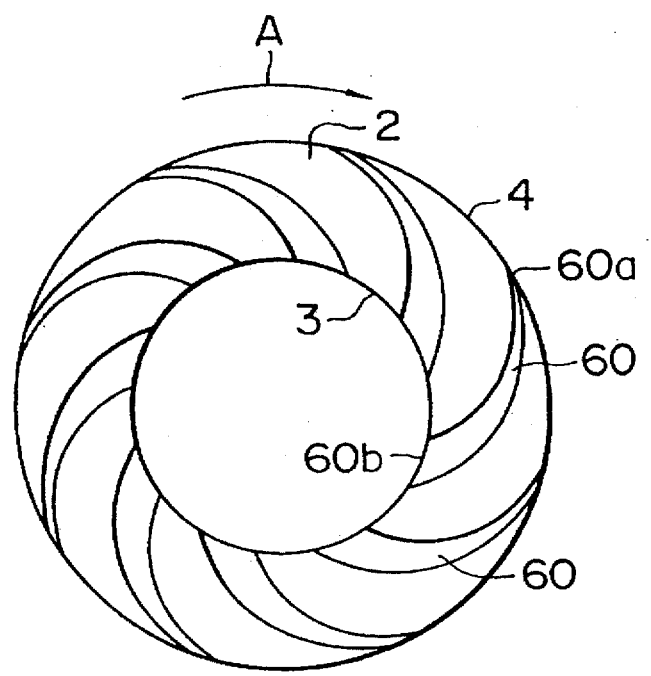
FIG. 6 is a plan view showing a friction surface of a comparative example 2.

FIG. 6 shows a comparative example 2 in which eight outer grooves 60 are formed in a friction surface 2. The outer grooves 60 extend between the inner peripheral edge 3 and the outer peripheral edge 4 in a direction reverse to those of the embodiment 2. A starting portion 60a of each of the outer grooves 60 has a width of 1.0 mm and a depth of 0.3 mm, and an opening portion 60b of an inner peripheral edge 3 has a width of 4.0 mm and a depth of 0.3 mm. Thus, the outer grooves 60 are slightly decreased in width gradually toward the outer periphery so as to be decreased in cross-sectional area. The outer grooves 60 extend, in a volute shape, form the starting portions 60a at an angle of about 45° toward the direction of sliding rotation of a mated member (not shown) which direction is indicated by the arrow A. The outer grooves 60 are located symmetrically with regard to the center of the annular frictional disc.

Figure 7:
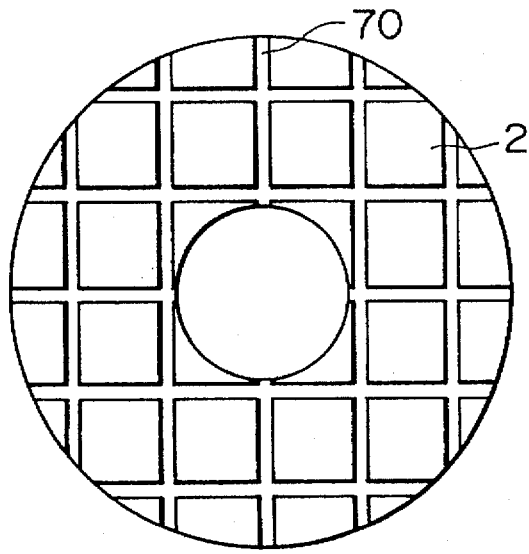
FIG. 7 is a plan view showing a friction surface of a comparative example 3.

FIG. 7 shows a comparative example 3 including lattice grooves 70 conventionally known as waffle grooves. Both the vertical and horizontal grooves 70 have a width of 1.0 mm and a depth of 0.3 mm and extend in a lattice form at intervals of 5 mm.

Figure 8:
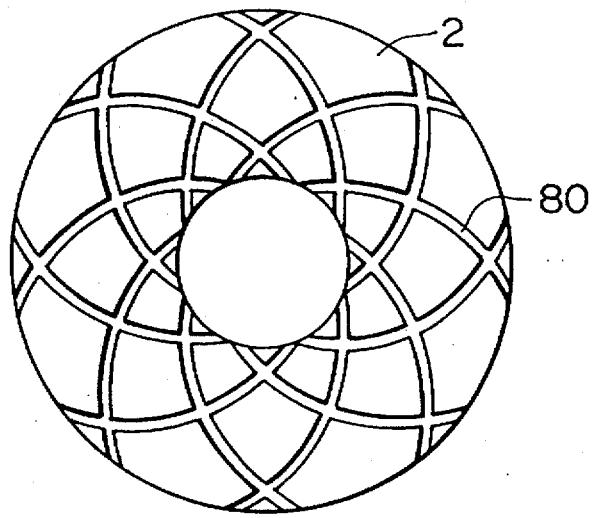
FIG. 8 is a plan view showing a friction surface of a comparative example 4.

FIG. 8 shows a comparative example 4 including grooves 80 conventionally known as sunburst grooves. The grooves 80 have a width of 1.0 mm and a depth of 0.3 mm. The grooves 80 on the right and left sides have arcuate forms which are curved symmetrically with each other.

Figure 9:
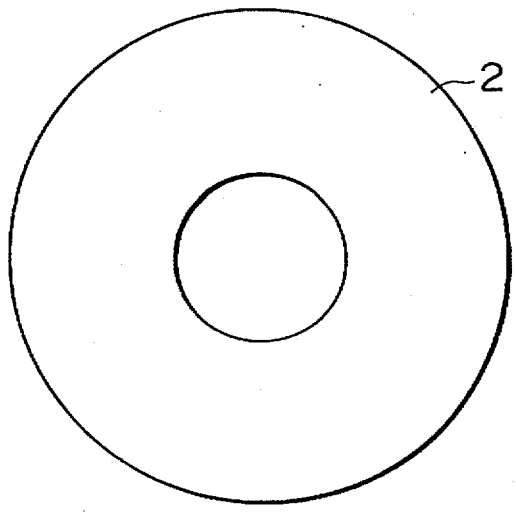
FIG. 9 is a plan view showing a friction surface of a comparative example 5.

FIG. 9 shows a comparative example 5 of a plain annular disc in which no grooves are formed on a friction surface 2.

Friction tests were performed to investigate the relationship between sliding velocities and friction coefficients of friction discs in the embodiments 1 to 4 and the comparative examples 1 to 5 described above. A disk having a friction surface made of steel, which was a mated member, was located in an oil bath rotatably at 1 to 1000 rpm, and the tests were performed while a static load was applied to each of the test friction discs. The oil bath was filled with ATF oil, and the friction discs were immersed in the oil bath.

Figure 10:
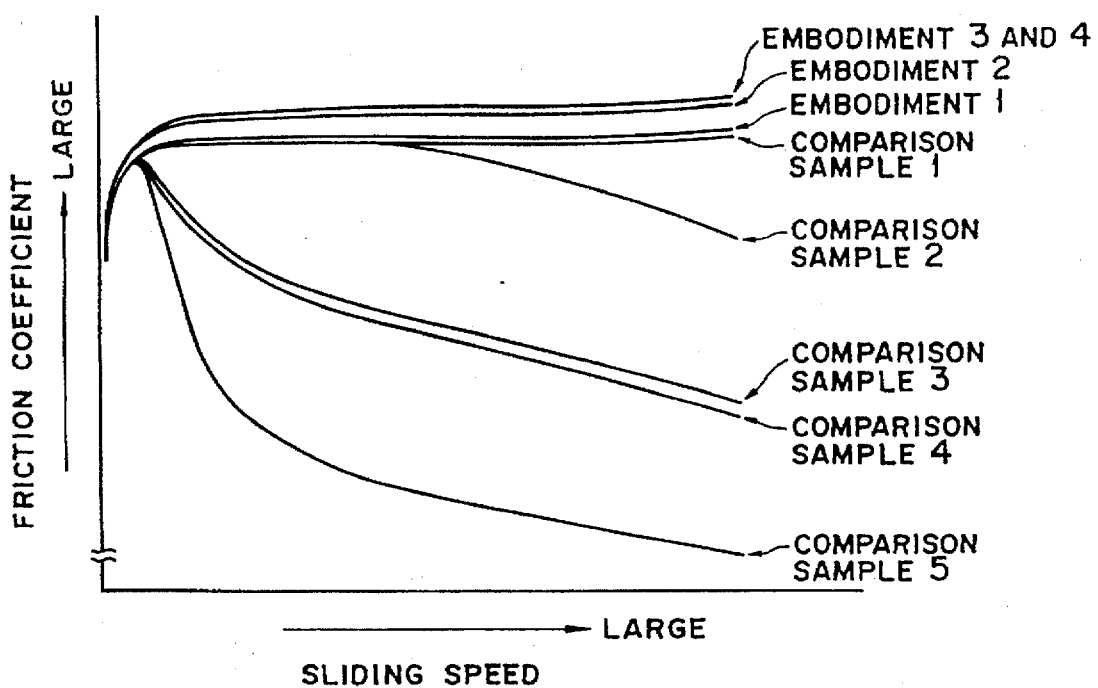
FIG. 10 is a graph illustrative of the relationship between the sliding velocity and the friction coefficient.

FIG. 10 shows results obtained from these tests.

In the comparative example 5, the friction coefficient greatly decreased as the sliding velocity increased. The comparative examples 3 and 4 showed that decrease of the friction coefficient can be lessened to some extent by forming the grooves 70, 80 in the friction surface.

In the comparative example 1, a relatively high friction coefficient was obtained even when the sliding velocity increased. This is presumably because the outer grooves 50 are opened at the outer periphery 4 while inclining toward the direction of sliding rotation with the result that cooling oil on the friction surface 2 is moved along side walls of the outer grooves 50 and quickly discharged toward and from the outer peripheral edge 4. However, the outer grooves 50 are opened at the inner periphery 3 in a direction reverse to the direction of sliding rotation, and consequently, the cooling oil is easily supplied into the outer grooves 50 from the inner peripheral edge 3, thus preventing removal of the cooling oil from the friction surface 2. Thus, as compared with the embodiments 1 to 4, the comparative example 1 still exhibited a lower friction coefficient.

In the comparative example 2, a higher friction coefficient than the comparative examples 3 to 5 was obtained. This is presumably because the outer grooves 60 are inclined toward the direction of sliding rotation and opened at the inner peripheral edge, so that cooling oil in the outer grooves 60 is moved along side walls of the outer grooves 60 and quickly discharged toward the inner peripheral edge 3. For this reason, in a region of low sliding velocity, the comparative example 2 exhibited substantially the same friction coefficient as the embodiment 1. However, the outer grooves 60 are opened at the outer peripheral edge 4 in the direction of sliding rotation, and consequently, more cooling oil tends to flow into the outer grooves 60 from the outer peripheral edge 4 as the sliding rotation velocity increases. This is presumably the reason why the friction coefficient of the comparative example 2 was lower than that of the comparative example 1.

In the embodiment 1, a high friction coefficient was obtained even when the sliding velocity increased. This is presumably because cooling oil in the outer grooves 10 flows along the groove walls and is quickly discharged from the outer peripheral edge although a viscous resistance of the cooling oil is diagonally applied to the walls of the outer grooves. Since the outer grooves extend from the intermediate portions of the friction surface toward the outer peripheral edge, a large amount of the cooling oil does not flow into the outer grooves, and the cooling oil is quickly discharged from the outer peripheral edge 4, so that the thickness of oil film between the friction surfaces is not increased.

The outer grooves 10 of the embodiment 1 are formed to extend only in one direction. Therefore, when the outer grooves 10 are formed by machining, the machining operation can be easily performed.

In the embodiment 2, a high friction coefficient was obtained even when the sliding velocity increased. This is presumably because the inner grooves 21 are formed in addition to the outer grooves 20 corresponding to the outer grooves 10 of the embodiment 1, so that the cooling oil in the inner grooves 21 flows along the groove walls and is discharged from the inner peripheral edge 3. Especially because the inner grooves 21 are individually formed without communicating with the outer grooves 20, the cooling oil in the inner grooves 21 is quickly moved along the groove walls and discharged from the inner peripheral edge 3.

In the embodiment 3, a high friction coefficient was obtained even when the sliding velocity increased. In addition to the outer grooves 30 (corresponding to the outer grooves 10 of the embodiment 1), the inner grooves 31 are also formed to extend toward the direction of sliding rotation of the mated member which direction is indicated by the arrow A. Consequently, a large amount of cooling oil does not flow into the inner grooves 31 from the opening portions at the inner peripheral edge 3, and also, cooling oil in the inner grooves 31 flows along the groove walls and is discharged from the inner peripheral edge 3. More specifically, the cooling oil is discharged in two directions, i.e., outwardly and inwardly, from the substantial widthwise-middle portion of the friction surface 2, so that discharge passages of the cooling oil are shortened to quickly discharge the cooling oil.

In the embodiment 4 including the circular groove 42 added to the grooves of the embodiment 3, substantially the same friction coefficient as that of the embodiment 3 was obtained. This is presumably because the circular groove 42 in the circumferential direction little affects the shearing resistance of cooling oil.

Next, tests of response quickness were performed with the embodiments 3 to 6. In embodiments 5 and 6, two and three circular grooves are formed in friction surfaces at positions for radially dividing the friction surfaces into three and four sections, respectively, although not shown.

In the response quickness tests, a disk having a friction surface made of steel, which was a mated member, was located in an oil bath rotatably at 1 to 1000 rpm, and the tests were performed while a fluctuating load was applied to each of the test friction plates placed on the friction surface of the disk. The oil bath was filled with ATF oil, and the friction plates were immersed in the oil bath.

Figure 11:
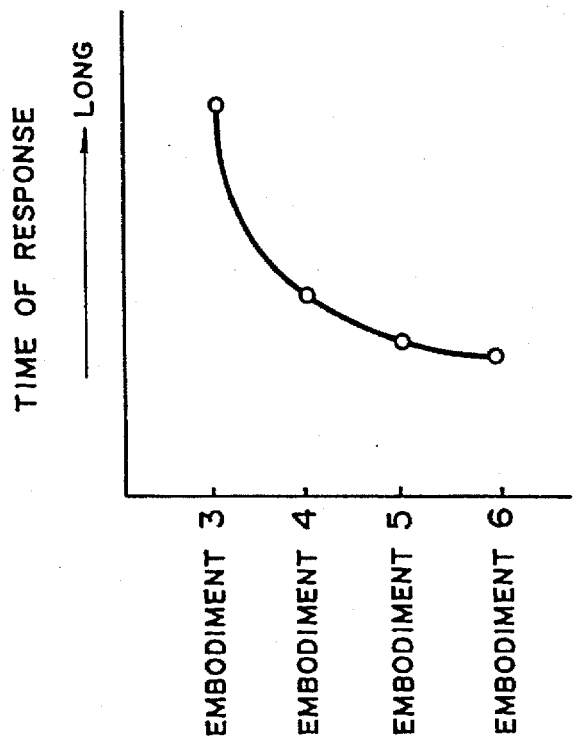
FIG. 11 is a graph illustrative of the relationship between the number of circular grooves and the response quickness.
Figure 12:
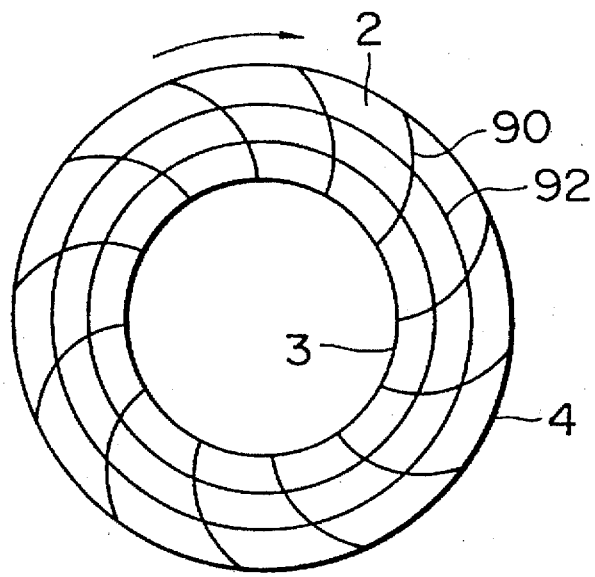
FIG. 12 is a plan view showing a friction surface of a conventional example.
Figure 13:
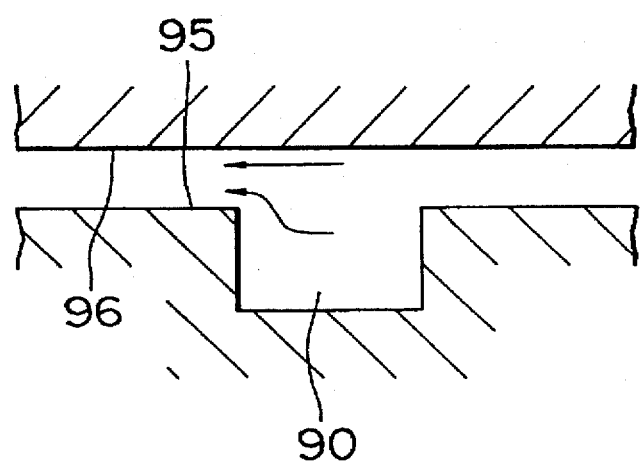
FIG. 13 is a cross-sectional view of a groove in a wet friction member facing a metal member, for explaining a problem.

As a result, as shown in FIG. 11, as the number of circular grooves increased from zero to one, two and three pieces, response time, i.e., a period of time until a predetermined friction coefficient was obtained when a load was applied, was shorter, thereby improving the response quickness.

It should be noted that the present invention is not restricted to the above-described embodiments 1 to 6, but that the following modifications can be effected:

(1) In the embodiments 1 to 6, the phenolic resin film was adhered to the surface of the base 1 of sintered metal, and the grooves were formed by machining the surface. However, the invention is not limited to this manufacturing method. Instead of the machining operation, for example, grooves may be integrally formed in the substrate. Also, films of synthetic resins other than the phenolic resin and paper films can be used. Further, a coating layer can be formed on a friction surface by baking or such means.

(2) In the embodiments 1 to 6, the wet friction discs of flat annular shapes were described. However, this invention can be applied to a friction member having a friction surface formed on a conical or spherical peripheral surface thereof.

(3) In the embodiments 1 to 6, six to eight grooves were provided. However, the number of grooves is not limited to these examples, but a large number of narrower grooves can be formed.

What is claimed is:

1. The combination of a wet friction member and a mated member, wherein the wet friction member is adapted to contact with or separate from the mated member while the mated member is rotating, said wet friction member having a base, a friction surface formed on the base and outer grooves formed on the friction surface each of which grooves extends from a starting position of intermediate portions of the friction surface and terminates onto the outer peripheral edge of the friction surface, said outer grooves being directed toward the direction of rotation of the mated member.

2. The combination according to claim 1, further including inner grooves formed on the friction surface each of which grooves is formed in a radially inner side of the friction surface while communicating with said outer grooves, said inner grooves being directed toward the direction of rotation of the mated member and opened at the inner peripheral edge of the friction surface.

3. The combination according to claim 1, further including inner grooves formed on the friction surface each of which grooves is formed in a radially inner side of the friction surface without communicating with said outer grooves, said inner grooves being directed toward the direction of rotation of the mated member and opened at the inner peripheral edge of the friction surface.

4. The combination according to claim 1, further including at least one circular groove formed on the friction surface which groove is concentrically formed in the friction surface.

5. The combination of a wet friction member and a facing mated member, wherein the wet friction member is adapted to contact with or separate from the mated member facing the friction member while the mated member is rotating, comprising an annular base provided with an outer periphery and an inner periphery, a friction surface formed at least on one side of the base, and outer grooves formed on the friction surface each of which grooves has a volute shape, each of said outer grooves extending spirally from a start position of a radially intermediate portion of the base to a terminating position on the outer periphery of said base, the groove-extending direction of each of the grooves being directed toward the direction of rotation of the mated member.

6. The combination of a wet friction member and a facing mated member, wherein the wet friction member is adapted to contact with or separate from the mated member facing the friction member while the mated member is rotating, comprising an annular base provided with an outer periphery and an inner periphery, a friction surface formed at least on one side of the base, outer grooves formed on the friction surface each of which grooves has a volute shape, and inner grooves formed on the friction surface each of which grooves has a volute shape, each of said outer grooves extending spirally from a start position of a radially intermediate portion of the base to a terminating position on the outer periphery of said base, the groove-extending direction of each of the grooves being directed toward the direction of rotation of the mated member, each of said inner grooves extending spirally from a start position of a radially intermediate portion of the base to a terminating position on the inner periphery of said base, the groove-extending direction of each of the inner grooves being directed toward the direction of rotation of the mated member.

7. The combination according to claim 6, wherein each of said outer grooves is spaced apart from each of the inner grooves.

8. The combination according to claim 6, wherein each of said outer grooves communicates with each of the inner grooves at the start position thereof.

9. The combination of a wet friction member and a facing mated member, wherein the wet friction member is adapted to contact with or separate from the mated member facing the friction member while the mated member is rotating, comprising an annular base provided with an outer periphery and an inner periphery, a friction surface formed at least on one side of the base, outer grooves formed on the friction surface each of which grooves has a volute shape, inner grooves formed on the friction surface each of which grooves has a volute shape, and at least one concentric circular groove formed on the friction surface which groove intersects with said outer and inner grooves, each of said outer grooves extending spirally from a start position of a radially intermediate portion of the base to a terminating position on the outer periphery of said friction member, the groove-extending direction of each of the grooves being directed toward the direction of rotation of the mated member, each of said inner grooves extending spirally from the start position of a radially intermediate portion of the base to the inner periphery of said base, the groove-extending direction of each of the inner grooves being directed toward the direction of rotation of the mated member.

10. The combination according to claim 2, further including at least one circular groove formed on the friction surface which groove is concentrically formed in the friction surface.

11. The combination according to claim 3, further including at least one circular groove formed on the friction surface which groove is concentrically formed in the friction surface.

12. A wet friction member adapted to sequentially contact with and separate from a rotating mated member in facing relationship to the friction member, said friction member comprising an annular base provided with an outer periphery and an inner periphery, a friction surface formed at least on one side of the base, outer grooves formed on the friction surface each of which grooves has a volute shape, and inner grooves formed on the friction surface each of which grooves has a volute shape, each of said outer grooves extending spirally from a start position of a radially intermediate portion of the base to a terminating portion on the outer periphery of said base, said wet friction member being adapted to be installed facing the mated member such that the groove-extending direction of each of the outer grooves is directed toward the direction of rotation of the mated member, each of said inner grooves extending spirally from a start position of a radially intermediate portion of the base to a terminating position on the inner periphery of said base, with the groove-extending direction of each of the inner grooves being directed toward the direction of rotation of the mated member.

13. A wet friction member according to claim 12, wherein each of said outer grooves is spaced apart from each of said inner grooves.

14. A wet friction member according to claim 12, wherein each of said outer grooves communicates with one of said inner grooves at a start position thereof.

15. A wet friction member adapted to contact with or separate from a rotating mated member, said wet friction member having a base, a friction surface formed on said base, outer grooves formed on the friction surface each of which grooves extends from a starting position of intermediate portions of the friction surface and terminates at the outer peripheral edge of the friction surface, and inner grooves formed on the friction surface each of which inner grooves is formed in a radially inner side of the friction surface and opened at the inner peripheral edge of the friction surface, said wet friction member being adapted to be installed facing the mating member such that said outer grooves are directed toward the direction of rotation of the mated member, and said inner grooves are directed toward the direction of rotation of the mated member.

16. A wet friction member according to claim 15, wherein said inner grooves communicate with said outer grooves.

17. A wet friction member according to claim 15, wherein said inner grooves do not communicate with said outer grooves.

18. A wet friction member according to claim 15, further including at least one circular groove formed on said friction surface, which circular groove is concentrically formed in said friction surface.

* * * * *